March 9, 1965 L. WALDICK 3,172,965

COMMUNICATION TRANSMISSION SYSTEM EMPLOYING INTERMEDIATE REPEATERS

Filed March 16, 1960 2 Sheets-Sheet 1

INVENTOR:
LEO WALDICK
BY Leon M. Strauss
Agt

INVENTOR:
LEO WALDICK
BY [signature]
AGT.

United States Patent Office 3,172,965

Patented Mar. 9, 1965

3,172,965 COMMUNICATION TRANSMISSION SYSTEM EMPLOYING INTERMEDIATE REPEATERS

Leo Waldick, Cologne-Dellbruck, Germany, assignor to Felten & Guilleaume Carlswerk Aktiengesellschaft, Cologne-Mulheim, Germany Filed Mar. 16, 1960, Ser. No. 15,375

Claims priority, application Germany, Apr. 10, 1959, F 28,167

6 Claims. (Cl. 179—175.31)

The invention refers to electric communication transmission systems with unmanned intermediate repeaters and more particularly concerns process and means for monitoring or checking the aging and other operating conditions of repeaters.

It is one of the primary objects of the present invention to provide means affording sensitive and accurate checking of transmission systems utilizing unmanned or difficultly accessible intermediate repeaters, and which means includes for economical reasons, appliances or means rendering it possible to check or monitor the operating conditions of unmanned intermediate repeaters and to detect damage, defective or inactivated repeaters among any of the remaining repeaters.

Checking of the operating conditions is particularly important in underwater cable installations with underwater or submarine repeaters, because the possibility of exchanging a repeater there depends on the prevailing weather conditions and season. It may be expedient to exchange a submarine repeater during a relative favorable season, though the operation is not jeoparized yet, if it has been found by checking the operating conditions that the respective repeater may lead to or will cause in the foreseeable future an interruption of the transmission.

It is possible to check aging of repeater installations by measuring variations in its non-linearity; because, in general, a pronounced premature aging will result in a corresponding increase of the non-linearity of the repeater.

Various methods have already been suggested for measuring the non-linearity of repeaters of terminal stations of a transmission system. The present invention pursues, however, a different path and contemplates the provision of means meeting the following conditions.

(1) The use of electromechanical switch elements in the unmanned repeater stations is to be avoided.

(2) The operation should be carried out with continuously emitted sinusoidal frequencies, hence with no pulses.

(3) The procedural performance should not only indicate whether any intermediate repeater in the transmission system has aged, but it should also permit a determination of position of the aged repeater.

The device according to the invention utilizes, in conventional manner, frequency-selective means, such as for example, electric filters, a certain characteristic frequency being assigned to each repeater, which frequency is not duplicated in the other repeaters.

According to the present invention several continuous alternating voltages of different frequency, particularly two test frequencies, are emitted from the two terminal stations, to form, in a conventional manner, intermodulation produces or beat frequencies. These intermodulation products or beat frequencies are received in both terminal stations or in one of them.

The test frequencies are so selected that the intermodulation product or beat frequency selected for the measurement of the non-linearity falls into a frequency range which is below the effective frequency bands of the repeaters. Besides, a band pass filter is provided, according to the invention, in each unmanned repeater, and is arranged between the output of the active repeater part and the low-frequency by-pass filter assembly of each repeater. The pass frequency of such band pass filter is different for each repeater and lies in the frequency range below the effective frequency bands of the repeaters.

Finally, the repeaters according to the present invention contain means to prevent the intermodulation product or beat frequency, which is characteristic of an intermediate repeater, from being falsified by portions of other repeaters. To this end, those low-pass filters, for example, of the intermediate repeaters, through which the lower effective frequency band leaves the repeaters, are designed as band pass filters having a wide band pass width, and which attenuate the frequencies below the effective frequency band. These low-pass filters have therefore an attenuation curve with respect to lower frequencies such that the intermodulation products or beat frequencies formed in the output of the active repeater part, as far as they are required for the measuring method, cannot continue to pass along the transmission path for the effective frequency bands.

These and other objects, advantages and aims of the invention will become further apparent from the following detailed description, reference being made to the accompanying drawings showing a preferred embodiment of the invention.

In the drawings which illustrate the best mode presently contemplated for carrying out the invention:

Figures 1, 2:
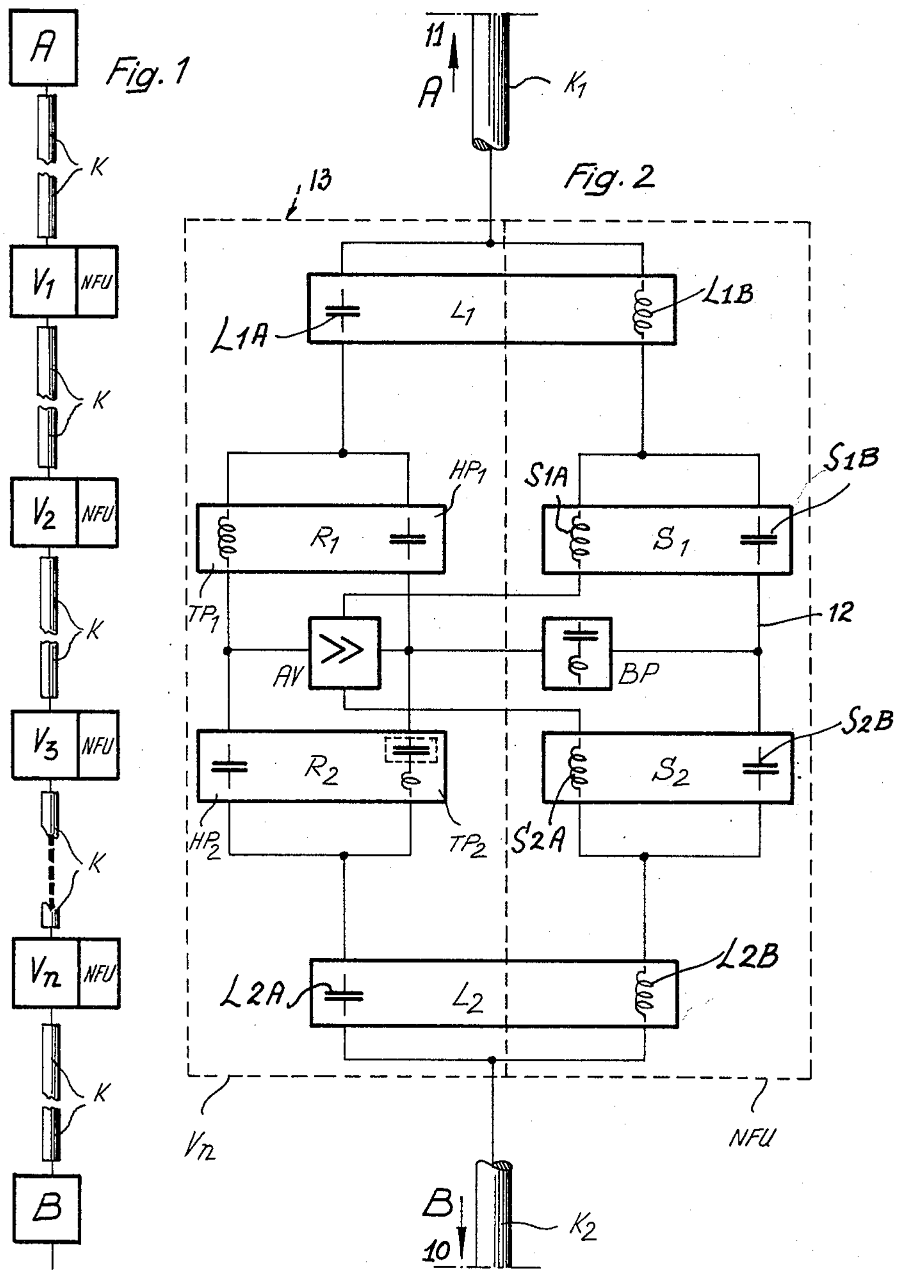
FIG. 1 illustrates a transmission system provided with repeaters pursuant to the present invention.
FIG. 2 is a diagrammatic representation of a repeater pursuant to the present invention.

The method according to the invention will be described more fully in connection with a repeater acting in opposite directions, a so-called two-way repeater. As shown in FIG. 1, the present invention is described in connection with a two-wire-separate position-transmission system, which is equipped with repeaters for 60 channels. The lower frequency band is assumed to be in the range of 24 to 264 k.c., and the upper frequency band is within the range of 312 to 552 k.c. The terminal stations or terminal offices of the transmission system are designated A and B; the unmanned repeaters being designated V1, V2, V3 . . . V*n*. The cable sections interposed between the individual repeaters, and between the terminals and the adjacent repeaters, are designated K. Each repeater has a low-frequency by-pass filter assembly NFU.

In FIG. 2, a typical repeater V*n* is illustrated in detail as having an active repeater section 13 provided with low-frequency by-pass filters. The repeater filter assemblies each contain high, low and band pass filter components, a high-pass filter being schematically represented by a condenser, a low-pass filter by a coil and a band pass filter by a combination coil-condenser. Assume that the lower effective frequency band of 24 to 224 kc. is transmitted from the terminal station A. The signal transmitted from the cable K1 first reaches the line filter L1 of the repeater. This lower effective frequency band passes first through filter portion L1A of line filter L1 and then through the low pass filter TP1 of the directional filter R1 to the active part AV of the repeater. From the output of the active part, the lower effective frequency band passes through the low filter pass TP2 of the directional filter R2 to the line filter L2 and through the filter portion L2A thereof to the cable K2 flowing in the direction of the terminal station B, as shown by arrow 10. The upper effective frequency band of 312 to 552 kc. which is transmitted from the terminal station B, flows in the reverse direction through the high pass filter portion L2A of the line filter L2, the high pass filter HP2 of the directional filter R2, through the active part AV of the repeater, the high pass filter HP1 of the directional filter R1 and through the filter portion L1A of line filter L1 to the terminal station A, as shown by arrow 11. The feed current flows through the low pass filter portion L1B of the line filter L1, which passes the low frequency voice currents, and the low filter portion S1A of the current supply filter S1 to the heater filaments of the tubes in the active part AV of the repeater, and through the low pass portion S2A of the current supply filter S2 and the low pass filter portion L2B of the line filter L2 to the cable, in the direction toward the terminal station B, as indicated by arrow 10. The two feed current supply filters S1 and S2 also each contain a high pass filter portion, S1B and S2B, which transmits the low-frequency voice currents.

One end of band pass filter BP is connected to the line 12 in the filter assembly NFU, between the high pass filters S1B and S2B. The other end of band pass filter BP is connected to the output of the active part AV of repeater. Finally it will be noted that the low pass filter TP2 of the directional filter R2 is constructed as a band pass filter, so that the low frequencies below 24 kc. cannot pass through it.

Assume that the band pass filter BP has a frequency pass characteristic of 10 kc. The terminal office A transmits the two test frequencies $f1$, which equals 100 kc. and $f2$, which equals 190 kc. for monitoring the repeater V$n$. Both test frequencies lie in the lower effective frequency range and pass through filters L1A and TP1 to the active part AV. These two test frequencies mix and form different intermodulation products or beat frequencies, particularly those of the type $2f_1 \pm f_2$. One resultant beat frequency is 10 kc. This beat frequency passes from part AV through the band pass filter BP in the low frequency by-pass section NFU and can thus be received in both terminal offices A and B.

In the above described method, the beat frequency of 10 kc. is also formed in the other repeaters. But in these other repeaters the band pass filters BP are tuned, according to the invention, to other frequencies than 10 kc. Consequently, beat frequency of 10 kc. formed in the other repeaters cannot leave the latter over the respective band pass BP. Nor can this beat frequency leave the other repeaters in any other way, because the attenuation curve of the low pass filters TP2 provided in the various repeaters prevents the beat frequency 10 kc. from leaving the repeaters over the path of the effective frequency bands. This assures that the intermodulation product or beat frequency received in the terminal offices originates only from the repeater to be tested. In any case, the test frequencies must be so chosen that they yield an intermodulation product or beat frequency that can pass through the band pass filter BP of the repeater to be tested, and only through the latter. This way it is impossible that the intermodulation product or beat frequency, which is characteristic of an intermediate repeater, can be falsified by portions of other repeaters.

The intermodulation products or beat frequencies have a low signal level and must at most travel half the distance to the terminal station unamplified. The sensitivity of this method, however, can be made relatively high by providing a very narrow band width receiver, for the measurement of the intermodulation products or beat frequencies, in the terminal station. This provides a very low noise level, so that even intermodulation products or beat frequencies having a very low signal level can be measured.

In case the intermodulation product or beat frequency received at the terminal station is too close to the noise level to permit a reliable measurement, it is possible to increase the non-linearity of the submarine repeaters by decreasing the feed current by a certain amount. Since, due to the high reverse feed back which is customary in these intermediate repeaters, this measure has practically no influence on their amplification, it is possible to obtain reproducible measuring results.

Another way for increasing the signal to noise ratio of the received intermodulation product or beat frequency is to provide an auxiliary repeater in the band pass path of each intermediate repeater or only in those intermediate repeaters that are farther away from the terminal stations. These auxiliary repeaters can be supplied with current in exactly the same way as the main repeaters over the remote-feeding systems of the intermediate repeaters.

The auxiliary repeater can, for example, be represented as a single or multi-stage resonance amplifier. The resonance principle can be used advantageously because ultimately the amplification of only one single frequency is to be accomplished. Therefore, even with a single stage repeater, relatively large amplification factors come about. Only with especially long stretches of cable is it necessary to use a two-stage auxiliary repeater.

Figure 3:
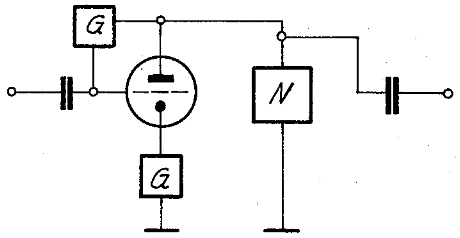
FIGS. 3 and 4 show, respectively, an electric circuit diagram for a single stage auxiliary repeated system and a multi-stage auxiliary repeater system employable in the invention.
Figure 4:
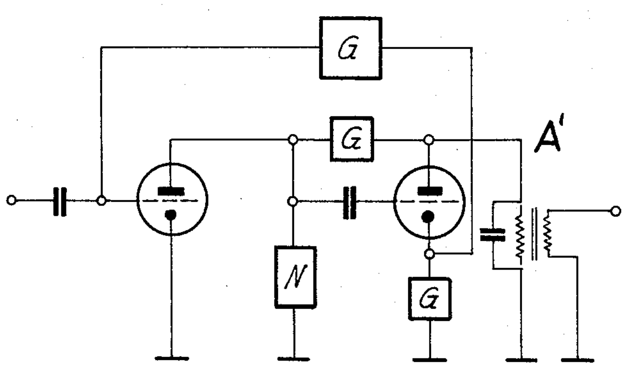

FIGS. 3 and 4 show such an auxiliary repeater in the single and multi-stage version. N refers to a network tuned to the band pass frequency. A′ refers to a similarly band pass frequency tuned output-transformer and G to a negative feedback network. The negative feedback networks produce a strong negative feedback which affords that the amplification factor remains constant, independently of outside influences or the aging of individual components.

The auxiliary repeaters can be equipped with tubes or transistors. The individual components are chosen with the same objectives as those chosen for the main repeaters, those being of long operating life and dependability.

The limit of range of modulation is so far above the maximum emission level that within the lifetime of the main repeater a falsification of the control signal resulting in an overload of the auxiliary repeater is avoided.

The present method can also be used to advantage for detecting damaged or dead repeaters or other troubles in the transmission line. If the repeaters operate between the terminal stations and the trouble area, the trouble area can be located by determining with the method described above which repeaters are still functioning properly. In this case an additional advantage of the present method manifests itself. It is possible to check all intermediate repeaters from both terminal stations, since the signal pass frequency of a certain band pass filter can be formed both by intermodulation or mixing of two frequencies of the lower transmission band and by intermodulation or mixing of two frequencies of the upper transmission band. In contrast to other methods, it is thus possible in any case to check those intermediate repeaters which are located between the trouble area and the terminal station, that contains the remote feed system, no matter whether this terminal station is station A or B.

Various changes and modifications may be made without departing from the spirit and scope of the present invention and it is intended that such changes and modifications be embraced by the annexed claims.

Having thus described the invention, what is claimed as new and desired to be secued by Letters Patent is:

1. In a method for surveying the condition of an underseas signal transmission line having repeaters spaced therealong and each of the type including a high frequency by-pass filter assembly for transmitting a range of high frequency carrier waves, a low frequency by-pass filter assembly for transmitting a range of low frequency feed currents and low frequency carrier modulations, and an active repeater section connected in both of said filter assemblies; the steps of transmitting, from one end of said transmission line, two test frequencies each within such high frequency range and having values such as to produce a respective beat frequency within such low frequency range and individual to the respective repeater to be surveyed; transmitting said respective beat frequency from the output of the active repeater section of the respective repeater to the low by-pass filter section thereof; receiving the thus transmitted beat frequency signal at an end of said lines; measuring the degree of relatively non-linearity of such beat frequency signal received at such end of said line; blocking transmission of said respective beat frequency from the active repeater sections of the other repeaters of said line; tuning the high frequency by-pass filter assembly of each active repeater section to sharply attenuate frequencies below said high frequency carrier wave range; and reducing the feed current for the intermediate repeaters during measurement of the beat frequency signal.

2. An underseas signal transmission system comprising, in combination, transmission means extending between a pair of terminal stations; repeaters spaced along said transmission means and each including a high frequency by-pass filter assembly for transmitting a range of high frequency carrier waves, a low frequency by-pass filter assembly for transmitting a range of low frequency feed currents and low frequency carrier modulations, an active repeater section connected in both of said filter assemblies, and a band pass filter connected between the output of the active repeater section and the low frequency by-pass filter assembly of each repeater; each of said band pass filters being tuned to a different selected frequency within such low frequency range; means for transmitting, from one end of said transmission line, two test frequencies each within such high frequency range and having values such as to produce a respective beat frequency within such low frequency range and corresponding to the selected band pass frequency of a respective repeater to be surveyed; means for receiving the beat frequency signal transmitted through the band pass filter of a respective repeater at an end of said line; and means at the end of said line for measuring the degree of relative non-linearity of the transmitted beat frequency signal received at such end of said line.

3. An underseas signal transmission line as claimed in claim 2, including means inhibiting falsification of the beat frequency signal transmitted by the respective repeater being surveyed.

4. A transmission line, as set forth in claim 3, in which said last-named means comprises band pass means in the respective repeater section, said last-named band pass means having a wide transmission range and being tuned to sharply attenuate frequencies below said high frequency carrier wave range.

5. A transmission line as set forth in claim 3, including means operable to increase the signal level of the transmitted beat frequency.

6. A transmission line as set forth in claim 5, in which said last mentioned means is an auxiliary repeater in the band pass filter path of each of said repeaters.

References Cited by the Examiner

UNITED STATES PATENTS

| | | | |
|---|---|---|---|
| 2,315,434 | 3/43 | Leibe | 179—175.31 |
| 2,315,435 | 3/43 | Leibe | 179—175.31 |
| 2,580,097 | 12/51 | Ilgenfritz | 179—175.31 |
| 2,823,270 | 2/58 | Cameron | 179—175.31 |
| 2,890,296 | 6/59 | Ponthus et al. | 179—175.31 |

FOREIGN PATENTS

| | | |
|---|---|---|
| 656,188 | 8/51 | Great Britain. |

ROBERT H. ROSE, *Primary Examiner.*

L. MILLER ANDRUS, WILLIAM C. COOPER, *Examiners.*